US012793050B2

(12) United States Patent
Boorstin et al.

(10) Patent No.: US 12,793,050 B2
(45) Date of Patent: Nov. 10, 2026

(54) BLOCKCHAIN TRANSACTION REBROADCAST

(71) Applicant: Circle Internet Financial, Inc., Boston, MA (US)

(72) Inventors: Marcus Boorstin, Cambridge, MA (US); Erik Tierney, Lexington, MA (US)

(73) Assignee: Circle Internet Financial Limited, Dublin (IE)

( * ) Notice: Subject to any disclaimer, the term of this patent is extended or adjusted under 35 U.S.C. 154(b) by 226 days.

(21) Appl. No.: 17/534,767

(22) Filed: Nov. 24, 2021

(65) Prior Publication Data

US 2023/0162178 A1 May 25, 2023

(51) Int. Cl.
*G06Q 20/38* (2012.01)
*G06Q 20/36* (2012.01)
*G06Q 20/40* (2012.01)

(52) U.S. Cl.
CPC ..... *G06Q 20/38215* (2013.01); *G06Q 20/363* (2013.01); *G06Q 20/3825* (2013.01); (Continued)

(58) Field of Classification Search
CPC ........... G06Q 20/38215; G06Q 20/363; G06Q 20/3825; G06Q 20/3827; G06Q 20/405; G06Q 20/407
See application file for complete search history.

(56) References Cited

U.S. PATENT DOCUMENTS 10,785,035 B1 * 9/2020 Lv ........................ G06F 16/2379
2020/0322132 A1 * 10/2020 Covaci .................. H04L 9/0637
(Continued)

FOREIGN PATENT DOCUMENTS

CN 113424171 A * 9/2021 .......... G06F 11/1402
GB 10202007907 P * 9/2020
(Continued)

OTHER PUBLICATIONS

PCT/US2022/050904, International Search Report and Written Opinion dated Apr. 6, 2023, 19 pages.
(Continued)

*Primary Examiner* — Neha Patel
*Assistant Examiner* — Davida Lee King
(74) *Attorney, Agent, or Firm* — Patterson + Sheridan, LLP

(57) ABSTRACT

Certain aspects of the present disclosure provide techniques for reliable cryptocurrency rebroadcasting. According to certain embodiments, after an initial transaction broadcast disclosed systems listen to a blockchain to determine if the transaction was included in the blockchain. If, after a short time period, the transaction is not confirmed, a transaction database record for the transaction is locked to prevent inadvertent rebroadcast. While the record is locked, the transaction format and replay information are verified, and depending on the blockchain, is updated. For blockchains having a transaction fee, the system reviews recent transactions to determine appropriate fees and if needed, updates the transaction fee accompanying the transaction. Once the replay information is verified/updated, and the transaction fee is sized appropriately, the database record is unlocked and the transaction is rebroadcasted.

20 Claims, 4 Drawing Sheets

(52) U.S. Cl.
CPC ....... *G06Q 20/3827* (2013.01); *G06Q 20/405* (2013.01); *G06Q 20/407* (2013.01)

(56) References Cited

U.S. PATENT DOCUMENTS

| | | | | |
|---|---|---|---|---|
| 2021/0014065 | A1 * | 1/2021 | Gourisetti | H04L 9/0637 |
| 2021/0224792 | A1 * | 7/2021 | Kumawat | H04L 9/0643 |
| 2022/0342951 | A1 * | 10/2022 | Doiron | G06F 21/6227 |

FOREIGN PATENT DOCUMENTS

| | | | | | |
|---|---|---|---|---|---|
| SG | 10202007907 | P * | 9/2020 | | H04L 9/3252 |
| WO | WO-2020112994 | A1 * | 6/2020 | | G06Q 20/401 |

OTHER PUBLICATIONS

Uttarwar Amiti et al., Mempool: rework rebroadcast logic to improve privacy, Jan. 3, 2020, https://github.com/bitcoin/bitcoin/pull/16698/files, 351 pages.
Uttarwar Amiti et al., [p2p] Introduce node rebroadcast module #21061, May 26, 2021, https://github.com/bitcoin/bitcoin bull/21061/files, 385 pages.
David Harding et al., Opt-in Full Replace-by-Fee Signaling, Oct. 5, 2020, https://github.com/bitcoin/bips/blob/eb57dc00dd49ce10fd463bd64aca3c4fadf60e04/bip-0125.mediawiki, 6 pages.

* cited by examiner

BLOCKCHAIN TRANSACTION REBROADCAST

INTRODUCTION

Aspects of the present disclosure relate to cryptocurrency transactions, and more particularly to rebroadcast of cryptocurrency transactions.

Blockchain networks are considered "eventually consistent" systems, in that for a given transaction it may take arbitrarily long to be propagated across the network to all nodes. Given the arbitrarily long time period that a transaction may take to be propagated, it can be a challenge to determine if a given transaction was picked up and processed by the network in a timely manner to support cryptocurrency transactions and related commerce. Moreover, some blockchains are slow and unstable, and unable to handle large volumes of transactions at a scale needed for a commercial-grade financial transaction system, causing further delay of a transaction being picked up and/or processed.

As a result, a user may naively rebroadcast unmodified transactions if they do not see that their initial transaction was picked up by a given blockchain. In some cases, a user may attempt to get their transaction to be picked up by paying large transaction fees. However, a transaction may not be picked up at all even with repeated broadcasting due to blockchain network unreliability, leaving a user without having completed the transaction. On the other hand, repeated broadcasting could result in the transaction being picked up multiple time, resulting in double spending. Because of the uncertainties created around cryptocurrency transaction broadcasts, how to mitigate situations where a transaction may not have been picked up for processing, blockchain networks and infrastructure can be challenging technical environments upon which to develop commercial financial transaction rails.

Accordingly, what is needed are systems and methods to mitigate the effects of conventional approaches around cryptocurrency transaction broadcast and rebroadcasting.

BRIEF SUMMARY

Certain embodiments provide a method for broadcasting a cryptocurrency transaction, that includes receiving a sending address of a first wallet operable on a blockchain of a network having a network protocol, a receiving address of a second wallet operable on the blockchain, and a transaction amount of a token, generating replay protection data based on the network protocol, and generating a transaction comprising the sending address, the receiving address, the transaction amount, the replay protection data, and a digital signature comprising a hash based on one of the sending address, the receiving address, the transaction amount, or the replay protection data. The method further includes generating a transaction database record comprising the transaction and a transaction broadcast request, broadcasting the transaction to the network according to the network protocol, and receiving an indication that the blockchain does not include the transaction, responsive to querying the blockchain with the sending address. The method further includes locking the transaction broadcast request in the transaction database record, verifying that the transaction is correctly formatted to be operable on the blockchain, unlocking the transaction broadcast request, and rebroadcasting the transaction to the network.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
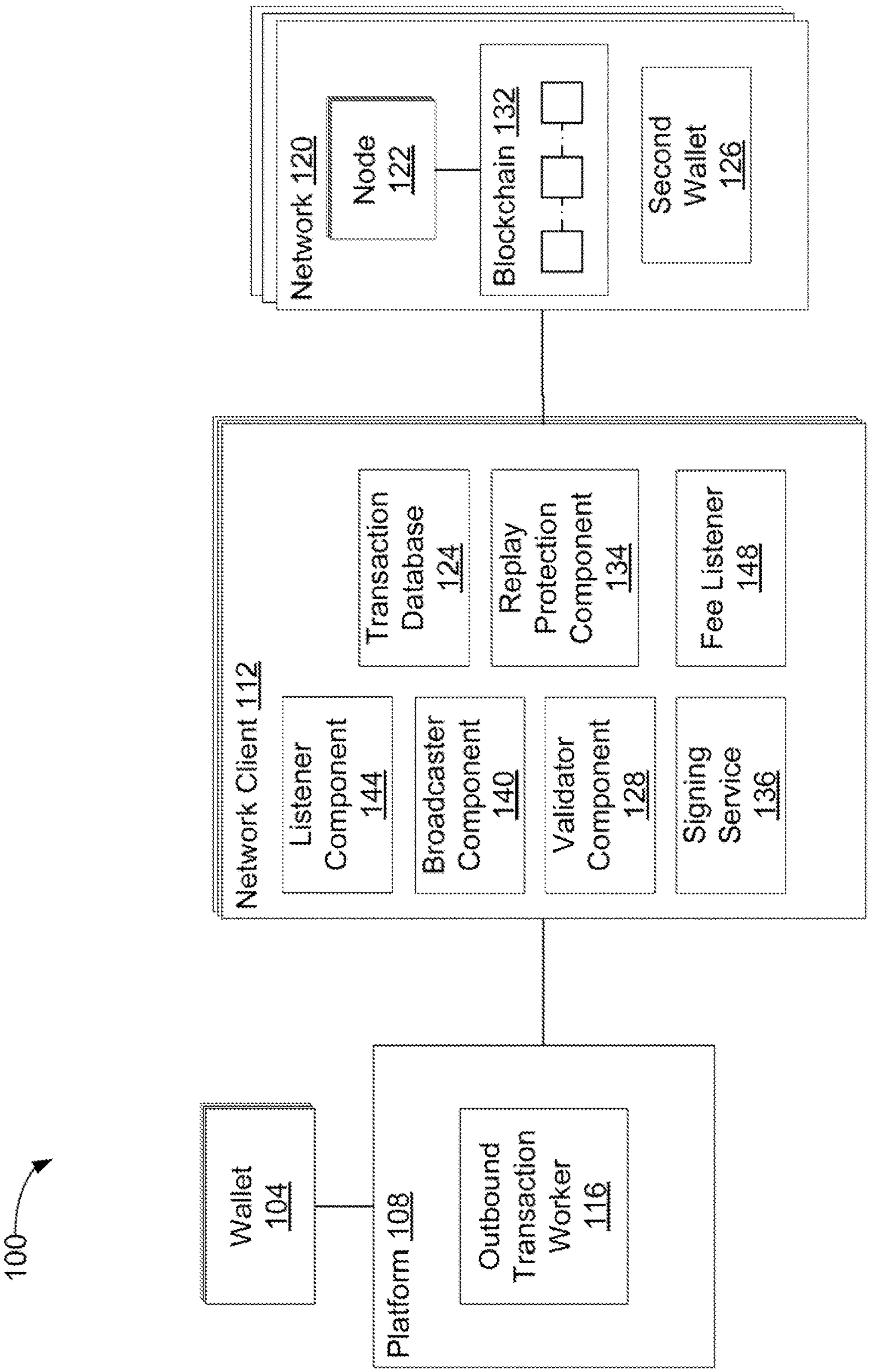
FIG. 1 depicts an example system for broadcasting a cryptocurrency transaction, according to certain embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure provide apparatuses, methods, processing systems, and computer-readable mediums for reliable cryptocurrency rebroadcasting. According to certain embodiments, after an initial transaction broadcast, disclosed systems listen to, or monitor, a blockchain to determine if the transaction was included in the blockchain. If, after a short time period, the transaction is not included in the blockchain, a transaction database record for the transaction is locked to prevent inadvertent rebroadcast. While the record is locked, the transaction format and replay information are verified to be operable on the blockchain, and depending on the blockchain, the replay information is updated. For blockchains having a transaction fee, the system reviews recent transactions to determine appropriate fees and, if needed, updates the transaction fee accompanying the transaction. Once the replay information is verified/updated, and the transaction fee is sized appropriately, the transaction database record is unlocked and the transaction is rebroadcasted.

According to certain embodiments, systems and methods are disclosed that monitor outgoing cryptocurrency transactions with processes that ensure a transaction is only processed by a blockchain one time. When a transaction is transmitted from a network client, the system first broadcasts the transaction with a low fee, for networks that require a fee. The network client then listens to, or monitors, the blockchain to determine if the transaction was included in the chain. In this context, in listening to, or monitoring, the blockchain, the network client queries the chain with the ID or hash of the transaction to see if the chain returns a value indicating that the transaction has been included in the chain, and if the transaction was successful. According to certain embodiments, the network client may wait a set amount of time, for example from 2-5 minutes in certain embodiments, before querying the chain for inclusion of the transaction. If the transaction was included, and successful, the network client marks the transaction as complete in a record related to the transaction in a transaction database.

If the network client fails to receive an indication that the transaction was included, the network client may then determine how to proceed with rebroadcasting the transaction to the blockchain. According to certain embodiments, depending on the network and blockchain, checks are performed to ensure that the original transaction is no longer valid. These checks may include computing the expiration time of the original transaction, which may be based on clock time or network time (e.g., a timestamp attached to the top block of the blockchain), or measured by waiting for a certain number of blocks to be added to the blockchain, before rebroadcasting. In embodiments where the network utilizes transaction address nonces, a transaction nonce may be used to ensure that the original transaction and a newly broadcasted transaction cannot both be accepted on the blockchain. According to certain embodiments, the network client may additionally use a transaction database having a record of the transaction to lock the transaction record (e.g., by locking a transaction broadcast request of the record) to ensure only one broadcast attempt is being made for a given transaction.

Once the checks have been satisfied, the network client of the system may rebroadcast the transaction. According to certain embodiments, the transaction may be rebroadcast with additional fees, for blockchains that allow for variable transaction fee amounts. When the transaction is rebroadcast, the network client resigns the transaction as necessary, and rebroadcasts the transaction.

Example System

FIG. 1 depicts an example system 100 for broadcasting a cryptocurrency transaction, according to certain embodiments. System 100 includes one or more cryptocurrency wallets, such as wallet 104, also referred to as a first wallet herein. Wallet 104, according to certain embodiments is a software application on a computing device, such as a mobile phone, tablet, laptop, or desktop computer, and in other embodiments may instead be implemented on a network and accessed via a web browser or other application. Wallet 104 is configured to store one or more cryptocurrency token types, such as by storing a reference to a block on a blockchain for a particular token type. Wallet 104 is further configured to generate transactions for stored token types.

System 100 further includes a platform 108 coupled to the wallet 104, for making calls to a cryptocurrency network client, such as network client 112, with a transaction generated by the wallet 104. Platform 108 includes an outbound transaction worker 116 for interacting with the network client 112 in this context.

Network client 112 is one of many network clients, each configured to interact with a particular cryptocurrency network, such as network 120. By way of example, network 120 may be one of ALGORAND™, BITCOIN™, ETHEREUM™, SOLANA™, STELLAR™, TRON™, and other cryptocurrency networks. Network 120 includes a number of network nodes, such as node 122, that may be a wallet such as second wallet 126, a validation anchor, such as a proof of work or proof of stake node, or other node typically found in a cryptocurrency network.

Network client 112 includes a transaction database 124 for storing a transaction received from the wallet 104. When a transaction is being prepared for broadcast, or rebroadcast, to network 120 as described below, the record containing the transaction may be locked to prevent inadvertent broadcast/rebroadcast. By way of example, in a multi-threaded process environment, there may be more than one thread having a valid broadcast command for a transaction, and locking the transaction database 124 record prevents broadcast before all actions for a proper transaction broadcast/rebroadcast, have been taken.

Network client 112 further includes a validator component 128. When a transaction is stored or updated in the transaction database, validator component 128 validates that transaction field values are correct. These transaction field values may include and are not limited to sending address (e.g., sending address of wallet 104 or proxy for such sending address), receiving address of a receiving wallet (or a proxy for such receiving address), transaction amount verification (e.g., verifying that the quantity of cryptocurrency tokens to send is available in the wallet 104), and replay protection (described below). By way of example, the sending address and receiving address may be validated by comparing the relevant transaction data against the sending and receiving address as stored on a blockchain 132 of the network 120.

Replay protection 134 generates appropriate replay protection for a transaction on the network 120 that is dependent on one or more replay protection functionalities provided by the network 120. By way of example and not limitation, some networks such as ETHEREUM and STELLAR provide replay protection in the form of a transaction nonce as part of a transaction. A transaction nonce provides a unique identifier for a transaction from a discrete wallet that is tracked on the blockchain 132. According to certain embodiments, a unique transaction nonce is provided for each transaction, and the network 120 will only accept transaction nonces from a given wallet in a particular order, such as numerical order; that is, a transaction having nonce n is to be processed (or intentionally cancelled or otherwise revoked) before a transaction having a nonce n+1. Nonce-based replay protection provides for reliable replacement of a broadcasted transaction: if a wallet wants to replace a transaction that has been broadcasted but not yet accepted into the blockchain 132, it can broadcast (e.g., rebroadcast)

a second transaction with the same transaction nonce, even where other parameters of the transaction have changed, such as the transaction fee, and the blockchain 132 will only accept one transaction having the given transaction nonce from the wallet 104.

Replay protection 134 may be provided in some networks by including reference data as part of a transaction from the wallet 104. Examples of networks that use reference data for transaction validation include SOLANA™ and TRON™. By way of example, such reference data may be a timestamp of a recent block (either a real-time timestamp, a block number, or other indicator of a relative creation time for a block) of the blockchain 132, and in other examples, a hash of a recent block of the blockchain 132 may be used. The timestamp or hash of the recent block provides a relative indicator of creation of that recent block, such that time since creation may be measured relative to that recent block in terms of the passage of real time, or number of blocks created since then. In either embodiments, the passage of time may be measured in real or relative terms. The network 120 will have a transaction protocol that receives the reference data of the transaction and compare to a set of rules that determine if a transaction is valid based on the passage of time since the reference data event occurred. Reference data may be used to determine if a broadcasted transaction remains valid, that in turn can cause the system to wait for the reference data to expire before rebroadcasting the transaction, or rebroadcasting while the initial broadcast transaction remains valid and take additional precautions to prevent a doubled transaction.

For some networks, both transaction nonces and reference data may be generated by replay protection component 134, such as FLOW™. For these networks, a transaction nonce is considered the primary form of replay protection, and the reference data (timestamp and/or block hash) is included as an additional form of replay protection to mitigate the ability for old transactions to be processed.

According to certain embodiments, replay protection may be implemented as unspent transaction output (UTXO), on some networks, such as on BITCOIN™.

Network client 112 further includes a signing service 136 for signing a transaction (e.g., including signing data as part of a transaction), prior to broadcast, to indicate authenticity of the source and contents of the transaction. According to certain embodiments, signing data may include the sending address of the wallet 104, the receiving address of the receiving second wallet 126, the transaction amount (e.g., how many tokens are involved in the transaction), and/or the replay protection data generated by replay protection component 134. Although the second wallet 126 is depicted as being on the network 120, according to certain embodiments the second wallet 126 may be coupled to the platform similar to wallet 104. According to certain embodiments, signing data may be a hashed and/or encrypted version of one or more of the above elements.

Network client 112 further includes a broadcaster component 140 that broadcasts the transaction to the network 120. In one example, the transaction is a data structure having transaction data that includes a sending address of the wallet 104, the receiving address of the receiving wallet, replay protection generated by replay protection component 134, and signing data from the signing service 136. As will be discussed below, the broadcaster component 140 can also rebroadcast a transaction that has not been picked up by the network 120, usually after some time period, and according to some embodiments, having some transaction data that has been changed, such as replay protection data, and signing data.

Network client 112 further includes a listener component 144, configured to listen to, or monitor, the blockchain 132. Based on the query, the network client 112 flags the transaction record in the transaction database as complete if the transaction has been found in a block of the blockchain 132 as a result of the query. If the transaction has not been found in a block of the blockchain 132, the network client 112 follows a process or method as described elsewhere herein.

Network client 112 further includes a fee listener 148, which may be used for networks having a variable transaction fee protocol, such as ETHEREUM. When the listener component 144 indicates that a transaction in the transaction database 124 has not been included in a block of the blockchain 132, fee listener 148 queries the blockchain 132, receiving in return an estimate from node 120 of a transaction fee amount that would be acceptable to include the transaction in the blockchain 132. Different networks that accept variable transaction fees calculate this estimate differently. Once the node 122 has returned the estimated fee, fee listener 148 may adjust the fee estimate.

In one example, the fee listener adjusts the fee based on a linear multiplier. The linear multiplier may vary based on circumstances, for example, enabling network client 112 to use a larger linear multiplier for urgent transactions, or smaller linear multipliers for transactions of a lower priority (e.g., transactions for which additional rebroadcast attempts are acceptable). In the event a transaction is to be rebroadcast, each successive rebroadcast will take the previous linear multiplier as input to determine the transaction fee amount for the subsequent rebroadcast.

In some aspects, the linear multiplier may be set statically for different priority levels assigned to different transactions. Higher values for the linear multiplier may be assigned to higher priority levels, such as priority levels for transactions that are visible to users within a cryptocurrency network. Lower values for the linear multiplier may similarly be assigned to lower priority levels, such as priority levels for transactions that are internal to a cryptocurrency network. The linear multiplier may be set, for example, based on a matrix of tokens, activity, and product for which a transaction is being performed. A linear multiplier may be defined for a base chain or for each type of token committed to a base chain. Activity multipliers may allow for different linear multipliers to be defined for different types of activity within a cryptocurrency network so that higher-priority activity can accept higher transaction fees (and thus be processed more quickly) and that lower priority activity can be processed when transaction fees are lower. Finally, different products may have different multipliers that, for example, may prioritize completion of transactions for one product over another product on the same cryptocurrency network.

In some aspects, the linear multiplier may be set dynamically. For example, a network client 112 can specify a linear multiplier to use in determining an acceptable transaction fee amount for including the transaction in the blockchain 132. Generally, higher values specified for the linear multiplier may allow a transaction to be completed more quickly, in exchange for paying a higher transaction fee for including the transaction in the blockchain. Likewise, lower values for the linear multiplier may delay completion of a transaction, as the transaction may not be committed to the blockchain 132 while the transaction fee amount is higher than an acceptable transaction fee amount.

Note that while a linear multiplier has been described as one example, aspects described herein are not limited to use of a linear multiplier. For example, other mechanisms and algorithms for setting the fee may be used.

Example Process

Figure 2:
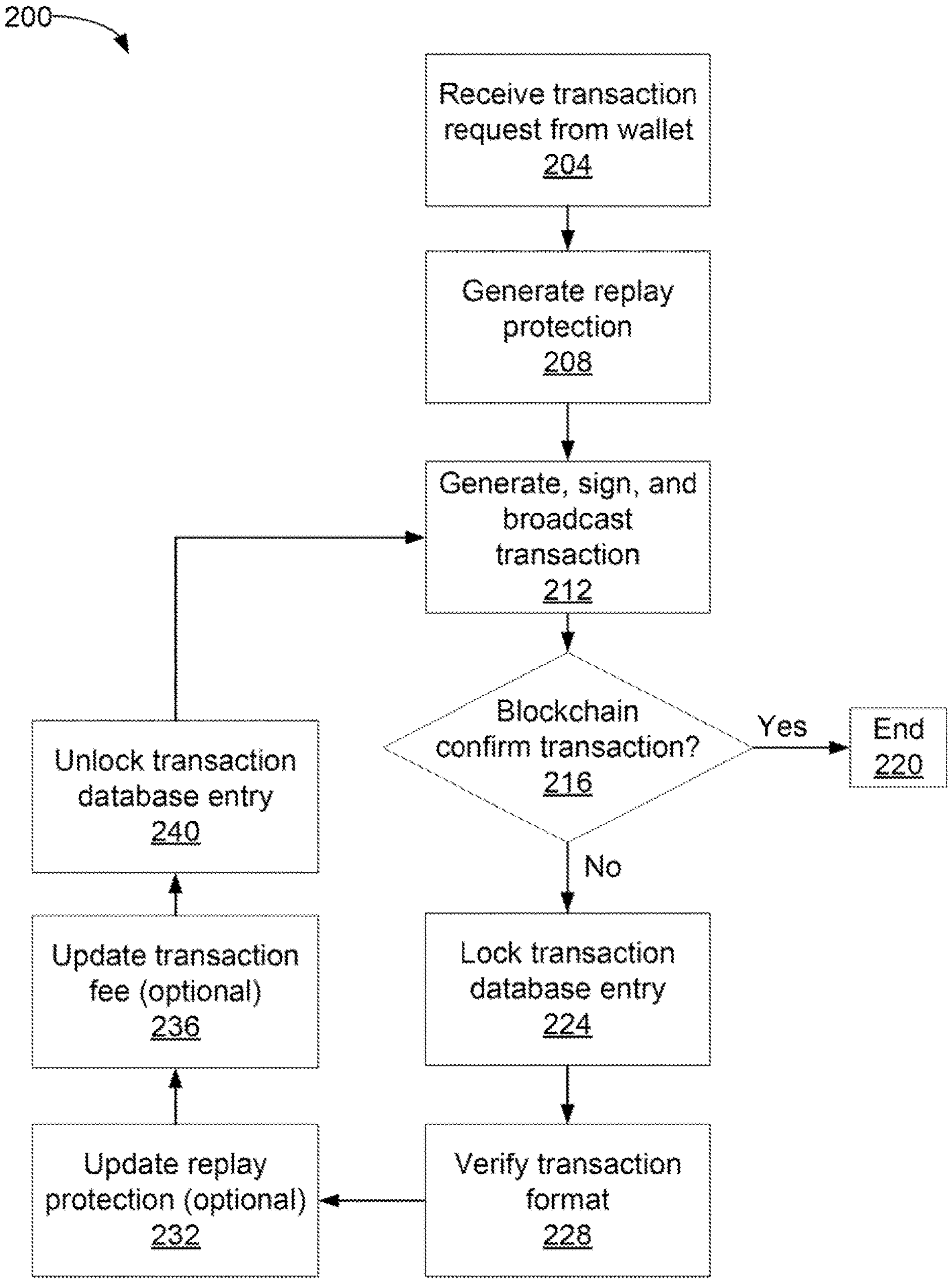
FIG. 2 depicts an example process for broadcasting a cryptocurrency transaction, according to certain embodiments.

FIG. 2 depicts an example process 200 for broadcasting a cryptocurrency transaction, according to certain embodiments.

At block 204, the platform 108 receives a request from the wallet 104 to broadcast a transaction to network 120. According to certain embodiments, the request includes a sending address of the wallet 104, a receiving address of a receiving wallet, and a transaction amount of a cryptocurrency token. Outbound transaction worker 116 receives the request and transmits the request to the network client 112.

At block 208, after storing the transaction request in a record of the transaction database 124 and locking the record to prevent inadvertent broadcast of the transaction to the network 120, replay protection component 134 generates replay protection in accordance with the replay protection protocols of the network 120, and stores the replay protection in the record.

At block 212, the signing service 136 signs the transaction, with signing data stored in the record, and the record is unlocked. The broadcaster component 140 assembles the transaction data structure and broadcasts the transaction, including sending address, receiving address, replay protection data, and signing data, to the network 120 where a node 122 may pick up the transaction for inclusion in the blockchain 132.

At block 216, the listener component 144 queries the blockchain after a predetermined amount of time, and if the transaction has been included in the blockchain, the process 200 ends at block 220. If the listener component 144 does not receive an indication that the transaction has been included in the blockchain 132, the process 200 proceeds to block 224. In this context, the predetermined amount of time is based on the typical amount of time taken for a transaction to be included in the blockchain 132. According to certain embodiments, this may be determined by replay protection data generated by replay protection component 134 for the network 120 (e.g., a set amount of real time, or a number of blocks since the block hashed as replay protection has been created), and in other embodiments the amount of time may be the average clock time taken on average over the previous number of transactions (e.g., 100 transactions), as detected by listener component 144.

At block 224, as a result of the listener component 144 having not received an indication that the transaction had been included in the blockchain 132, the transaction database 124 record containing the transaction data is locked to prevent inadvertent rebroadcast.

At block 228, the network client 112 verifies the transaction format, including sending and receiving address, transaction amount, replay protection, and signature, are operable on the blockchain 132.

At block 232, replay protection component 134 updates the replay protection in the transaction database 124, depending on the replay protection protocols of the network. According to certain embodiments, a transaction nonce may be updated to reflect the same transaction nonce so as to ensure that only one version of the transaction is included in the blockchain. In some embodiments, reference data is updated if the original reference data has become outdated. As not all networks use replay protection, or in some cases there is no need to change replay protection, block 232 may be optional.

At block 236, the transaction fee of the transaction database is updated (e.g., increased) so that the transaction, once rebroadcasted by the broadcaster component 140, is more likely to be picked up by the blockchain 132. The transaction fee is updated based on a data provided by the fee listener 148 that receives data from the blockchain regarding transaction fee amounts from recent successful transactions, and provides a normalized fee amount for the transaction, to increase the probability that the transaction is picked up.

At block 240, the transaction record in the transaction database 124 is unlocked, and the data from the transaction record is provided to block 212, where the transaction for the network 120 is generated, signed, and rebroadcast to the network 120.

Note that process 200 is described in the context of components of example system 100, and in other embodiments, process 200 may be performed by other systems configured to perform the same steps of process 200.

Example Method

Figure 3:
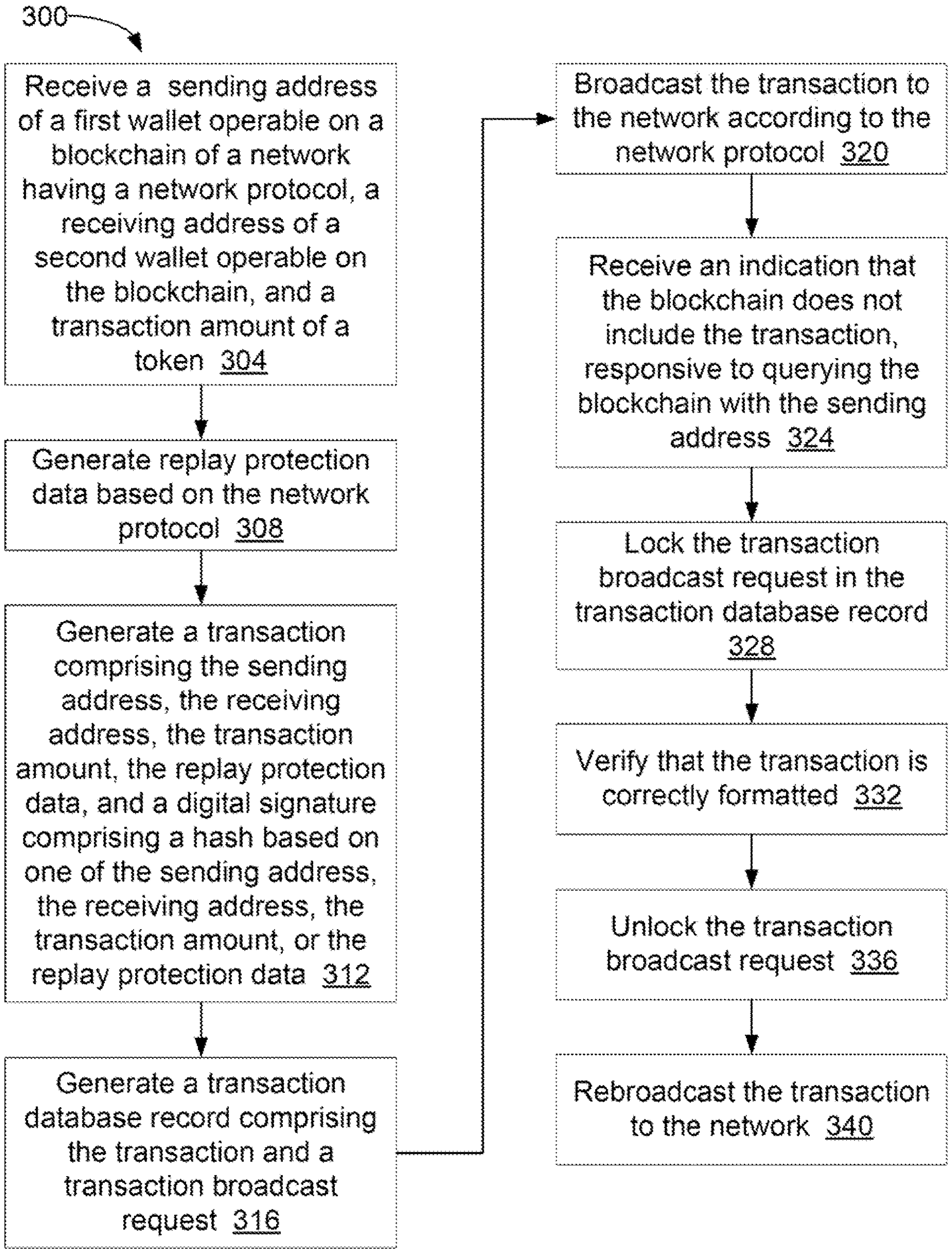
FIG. 3 depicts an example method for broadcasting a cryptocurrency transaction, according to certain embodiments.

FIG. 3 depicts an example method 300 for broadcasting a cryptocurrency transaction, according to certain embodiments.

At block 304, the network client 112 receives a sending address of a first wallet operable on a blockchain of a network having a network protocol, a receiving address of a second wallet operable on the blockchain, and a transaction amount of a token.

At block 308, the replay protection component 134 generates replay protection data based on the network protocol of the network 120.

At block 312 the network client 112 generates a transaction comprising the sending address, the receiving address, the transaction amount, the replay protection data, and a digital signature comprising a hash based on one of the sending address, the receiving address, the transaction amount, or the replay protection data, and stores the transaction in the transaction database 124.

At block 316, the network client 112 generates a transaction database 124 record comprising the transaction and a transaction broadcast request.

At block 320, the network client 112 broadcasts the transaction to the network according to the network protocol.

At block 324, the network client 112 receives an indication that the blockchain does not include the transaction, responsive to querying the blockchain with the sending address.

At block 328, the network client 112 locks the transaction broadcast request in the transaction database record.

At block 332, the network client 112 verifies that the transaction is correctly formatted to be operable on the blockchain 132.

At block 336, the network client 112 unlocks the transaction broadcast request.

At block 340, the broadcaster component 140 rebroadcasts the transaction to the network 120.

The method further comprises determining that the transaction is one or not valid, or will be invalidated by the rebroadcasting, based on the replay protection data.

The method further comprises querying the blockchain with the sending address, responsive to the locking, and determining that the blockchain does not include the transaction. According to certain embodiments, the method further includes verifying that the transaction is not operable.

According to certain embodiments the method further comprises generating a second transaction, comprising the sending address, the receiving address, and the transaction amount, generating new replay protection data, and signing the second transaction with a second digital signature comprising a hash based on one of the sending address, the receiving address, the transaction amount, or the new replay protection data. According to certain embodiments, generating the new replay protection data comprises one of generating updated replay protection data or increasing a transaction fee. According to certain embodiments, the updated replay protection data comprises one of a timestamp, a reference block hash, a transaction hash, a transaction nonce, or an unspent transaction output (UTXO).

Note that FIG. 3 is just one example of a method, and other methods including fewer, additional, or alternative steps are possible consistent with this disclosure.

Example Processing System

Figure 4:
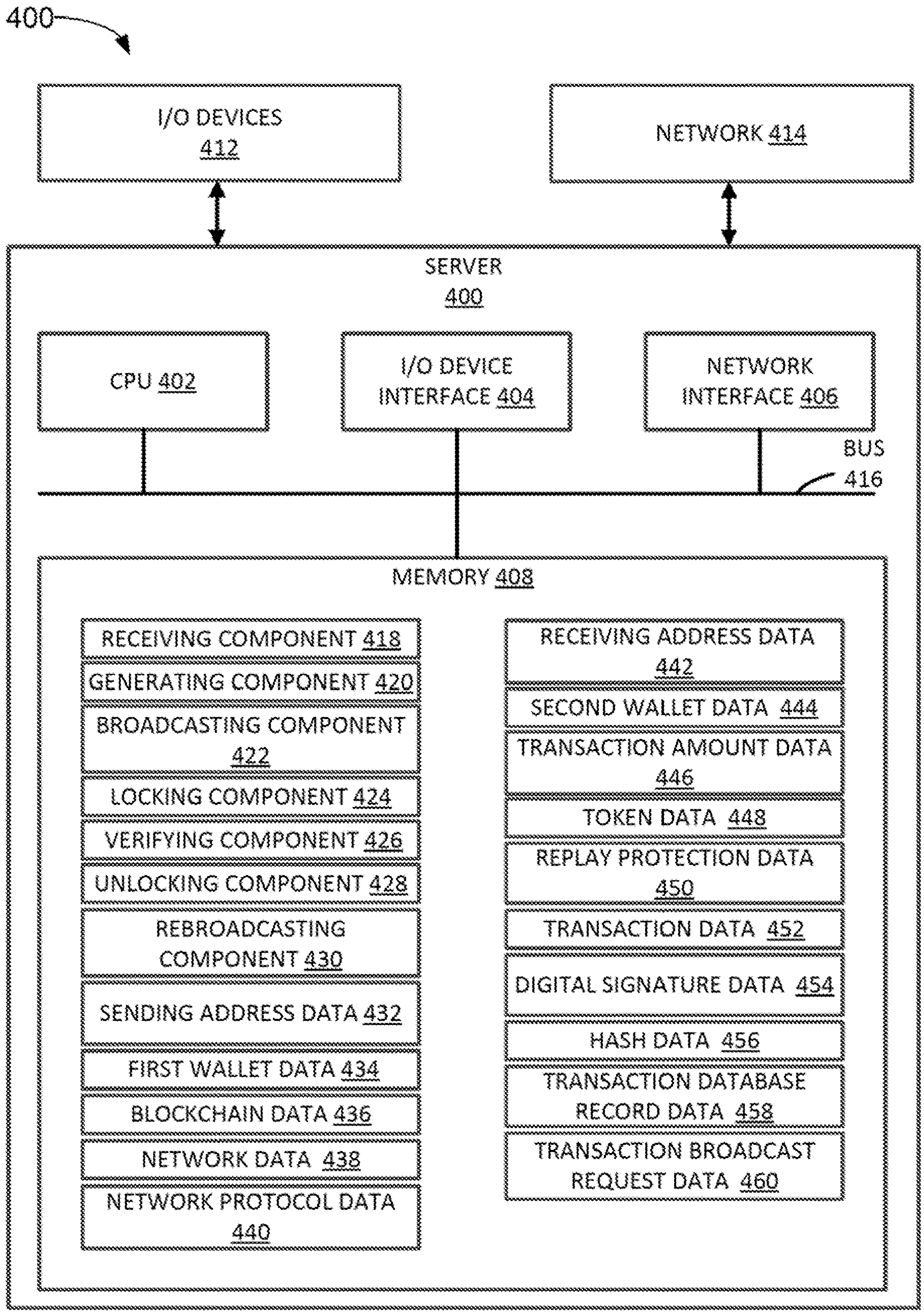
FIG. 4 depicts an example processing system for broadcasting a cryptocurrency transaction, according to certain embodiments.

FIG. 4 depicts an example processing system 400 for broadcasting a cryptocurrency transaction, according to certain embodiments, which may perform methods described herein, such as the method for blockchain transaction rebroadcast described with respect to FIGS. 2 and 3.

Processing system 400 includes a central processing unit (CPU) 402 connected to a data bus 416. CPU 402 is configured to process computer-executable instructions, e.g., stored in memory 408, and to cause the processing system 400 to perform methods described herein, for example with respect to FIGS. 2 and 3. CPU 402 is included to be representative of a single CPU, multiple CPUs, a single CPU having multiple processing cores, and other forms of processing architecture capable of executing computer-executable instructions. Memory 408 is included to be representative of one or more memory devices such as volatile memories, that may be a RAM, cache or other short-term memory that may be implemented in hardware or emulated in software, one or more non-volatile memories such as a hard drive, solid state drive, or other long term memory that may be implemented in hardware or emulated in software, or a combination of volatile and non-volatile memories. Moreover, one or more memory devices that make up memory 408 may be located remotely from processing system 400 and access via a network.

Processing system 400 further includes input/output (I/O) device(s) 412 and interfaces 404, which allows processing system 400 to interface with input/output devices 412, such as, for example, keyboards, displays, mouse devices, pen input, and other devices that allow for interaction with processing system 400. Note that processing system 400 may connect with external I/O devices through physical and wireless connections (e.g., an external display device).

Processing system 400 further includes a network interface 406, which provides processing system 400 with access to external network 414 and thereby external computing devices.

Processing system 400 further includes memory 408, which in this example includes a receiving component 418, a generating component 420, a broadcasting component 422, a locking component 424, a verifying component 426, an unlocking component 428, and a rebroadcasting component 430, for performing operations, such as those described with respect to FIGS. 2 and 3. Memory 408 further includes, in this example, sending address data 432, first wallet data 434, blockchain data 436, network data 438, network protocol data 440, receiving address data 442, second wallet data 444, transaction amount data 446, token data 448, replay protection data 450, transaction data 452, digital signature data 454, hash data 456, transaction database record data 458, and transaction broadcast request data 460, which may be used in performing operations described in FIGS. 2 and 3.

Note that FIG. 4 is just one example of a processing system, and other processing systems including fewer, additional, or alternative steps are possible consistent with this disclosure.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for broadcasting a cryptocurrency transaction, comprising:

receiving a sending address of a first wallet operable on a blockchain of a network having a network protocol, a receiving address of a second wallet operable on the blockchain, and a transaction amount of a token;

generating replay protection data based on the network protocol;

generating, at a client device, a transaction comprising the sending address, the receiving address, the transaction amount, the replay protection data, and a digital signature comprising a hash based on one of the sending address, the receiving address, the transaction amount, or the replay protection data;

generating a transaction database record in an off-chain transaction database at the client device, the transaction database record comprising the transaction and a transaction broadcast request;

broadcasting the transaction to the network according to the network protocol;

receiving an indication that the blockchain does not include the transaction, responsive to querying the blockchain with the sending address;

locking the transaction broadcast request in the transaction database record in the off-chain transaction database based on receiving the indication that the blockchain does not include the transaction, wherein locking the transaction broadcast request blocks rebroadcasting of the transaction to the network while the transaction is verified by the client device and allows a single broadcast attempt to be outstanding for the transaction;

verifying that the transaction is correctly formatted, wherein verifying that the transaction is correctly formatted includes verifying that the sending address, the receiving address, the transaction amount, the replay protection data, and the digital signature are operable on the blockchain;

unlocking the transaction broadcast request in the off-chain transaction database based on verifying that the transaction is correctly formatted; and rebroadcasting the transaction to the network.

2. The method of claim 1, further comprising determining that the transaction is one of not valid or will be invalidated by the rebroadcasting, based on the replay protection data.

3. The method of claim 1, further comprising:

querying the blockchain with the sending address responsive to the locking; and determining that the blockchain does not include the transaction.

4. The method of claim 3, further comprising verifying that the transaction is not operable.

5. The method of claim 4, further comprising:

generating a second transaction, comprising the sending address, the receiving address, and the transaction amount;

generating new replay protection data; and signing the second transaction with a second digital signature comprising a second hash based on one of the sending address, the receiving address, the transaction amount, or the new replay protection data.

6. The method of claim 5, wherein generating new replay protection data comprises one of generating updated replay protection data or increasing a transaction fee.

7. The method of claim 6 wherein the updated replay protection data comprises one of a timestamp, a reference block hash, a transaction hash, a transaction nonce, or an unspent transaction output (UTXO).

8. A system for broadcasting a cryptocurrency transaction comprising:

a memory comprising computer-readable instructions;

a processor configured to read the computer-readable instructions that, when executed, cause the system to:

receive a sending address of a first wallet operable on a blockchain of a network having a network protocol, a receiving address of a second wallet operable on the blockchain, and a transaction amount of a token;

generate replay protection data based on the network protocol;

generate, at a client device, a transaction comprising the sending address, the receiving address, the transaction amount, the replay protection data, and a digital signature comprising a hash based on one of the sending address, the receiving address, the transaction amount, or the replay protection data;

generate a transaction database record in an off-chain transaction database at the client device, the transaction database record comprising the transaction and a transaction broadcast request;

broadcast the transaction to the network according to the network protocol;

receive an indication that the blockchain does not include the transaction, responsive to querying the blockchain with the sending address;

lock the transaction broadcast request in the transaction database record in the off-chain transaction database based on receiving the indication that the blockchain does not include the transaction, wherein locking the transaction broadcast request blocks rebroadcasting of the transaction to the network while the transaction is verified by the client device and allows a single broadcast attempt to be outstanding for the transaction;

verify that the transaction is correctly formatted, wherein verifying that the transaction is correctly formatted includes verifying that the sending address, the receiving address, the transaction amount, the replay protection data, and the digital signature are operable on the blockchain;

unlock the transaction broadcast request in the off-chain transaction database based on verifying that the transaction is correctly formatted; and rebroadcast the transaction to the network.

9. The system of claim 8, the computer-readable instructions further causing the system to determine that the transaction is one of not valid or will be invalidated by the rebroadcast, based on the replay protection data.

10. The system of claim 8, the computer-readable instructions further causing the system to:

query the blockchain with the sending address responsive to the computer-readable instructions that cause the system to lock; and determine that the blockchain does not include the transaction.

11. The system of claim 10, the computer-readable instructions further causing the system to verify that the transaction is not operable.

12. The system of claim 10, the computer-readable instructions further causing the system to:

generate a second transaction comprising the sending address, the receiving address, the transaction amount;

generating new replay protection data; and signing the transaction with a second digital signature comprising a second hash based on one of the sending address, the receiving address, the transaction amount, or the new replay protection data.

13. The system of claim 12, wherein the computer-readable instructions that generate new replay protection data causes the system to generating updated replay protection data or increasing a transaction fee.

14. The system of claim 13 wherein the updated replay protection data comprises one of a timestamp, a reference block hash, a transaction hash, a transaction nonce, or an unspent transaction output (UTXO).

15. A non-transitory computer-readable medium comprising computer-readable instructions for a method to broadcast a cryptocurrency transaction, the method comprising:

receiving a sending address of a first wallet operable on a blockchain of a network having a network protocol, a receiving address of a second wallet operable on the blockchain, and a transaction amount of a token;

generating replay protection data based on the network protocol;

generating, at a client device, a transaction comprising the sending address, the receiving address, the transaction amount, the replay protection data, and a digital signature comprising a hash based on one of the sending address, the receiving address, the transaction amount, or the replay protection data;

generating a transaction database record in an off-chain transaction database at the client device, the transaction database record comprising the transaction and a transaction broadcast request;

broadcasting the transaction to the network according to the network protocol;

receiving an indication that the blockchain does not include the transaction, responsive to querying the blockchain with the sending address;

locking the transaction broadcast request in the transaction database record in the off-chain transaction database based on receiving the indication that the blockchain does not include the transaction, wherein locking the transaction broadcast request blocks rebroadcasting of the transaction to the network while the transaction is verified by the client device and allows a single broadcast attempt to be outstanding for the transaction;

verifying that the transaction is correctly formatted, wherein verifying that the transaction is correctly formatted includes verifying that the sending address, the receiving address, the transaction amount, the replay protection data, and the digital signature are operable on the blockchain;

unlocking the transaction broadcast request in the off-chain transaction database based on verifying that the transaction is correctly formatted; and rebroadcasting the transaction to the network.

16. The non-transitory computer-readable medium of claim 15, the method further comprising determining that the transaction is one of not valid or will be invalidated by the rebroadcasting, based on the replay protection data.

17. The non-transitory computer-readable medium of claim 15, the method further comprising:

querying the blockchain with the sending address responsive to the locking; and determining that the blockchain does not include the transaction.

18. The non-transitory computer-readable medium of claim 17, the method further comprising verifying that the transaction is not operable.

19. The non-transitory computer-readable medium of claim 18, the method further comprising:

generating a second transaction, comprising the sending address, the receiving address, the transaction amount;

generating new replay protection data; and signing the second transaction with a second digital signature comprising a second hash based on one of the sending address, the receiving address, the transaction amount, or the new replay protection data.

20. The non-transitory computer-readable medium of claim 19, wherein generating new replay protection data comprises one of generating updated replay protection data or increasing a transaction fee.

* * * * *